(No Model.)
F. O. WILLIAMS & A. & J. C. MATTICE.
POTATO DIGGER.
No. 324,202. Patented Aug. 11, 1885.
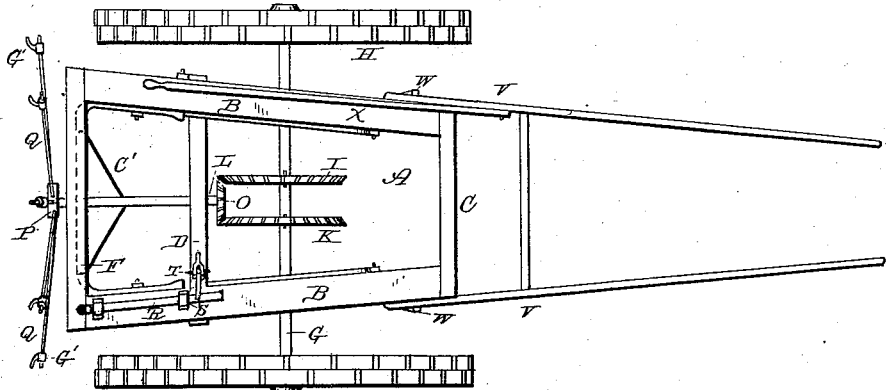
Fig. 1.
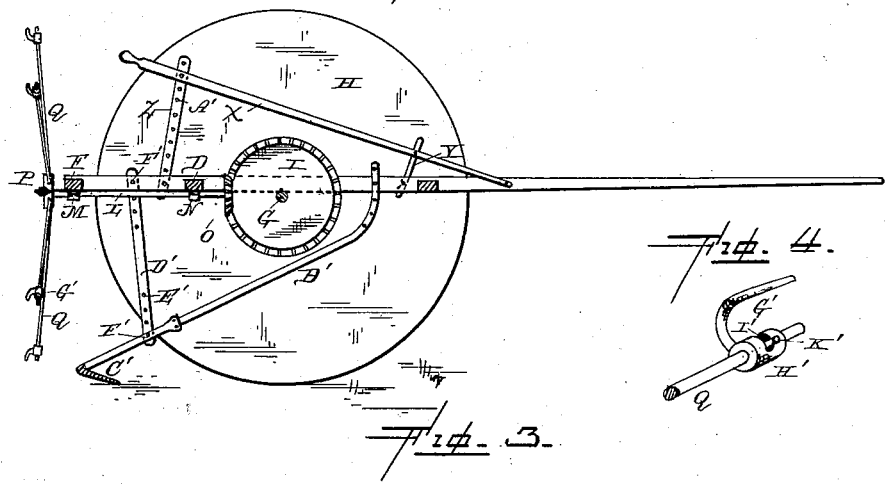
Fig. 2.
Fig. 3.
Fig. 4.
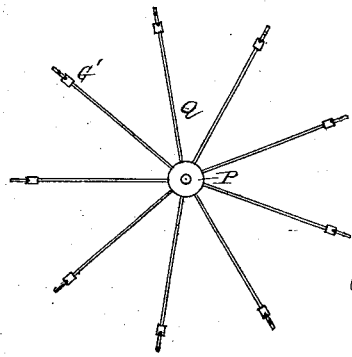
Witnesses:
L. F. Gardner
J. W. Garner
Inventors:
F. O. Williams
Aaron Mattice
J. C. Mattice
per
F. A. Lehmann, Atty.

UNITED STATES PATENT OFFICE.

FRANCIS O. WILLIAMS, AARON MATTICE, AND JOHN C. MATTICE, OF COHOCTON, NEW YORK.

POTATO-DIGGER.

SPECIFICATION forming part of Letters Patent No. 324,202, dated August 11, 1885.

Application filed October 8, 1884. (No model.)

*To all whom it may concern:*

Be it known that we, FRANCIS O. WILLIAMS, AARON MATTICE, and JOHN C. MATTICE, of Cohocton, in the county of Steuben and State of New York, have invented certain new and useful Improvements in Potato-Diggers; and we do hereby declare the following to be a full, clear, and exact description of the invention, such as will enable others skilled in the art to which it pertains to make and use it, reference being had to the accompanying drawings, which form part of this specification.

Our invention relates to an improvement in potato-diggers; and it consists in the reel provided with radial spokes and fingers applied to the outer ends of said spokes and permitted a partial rotation thereon, as will be more fully set forth hereinafter.

In the accompanying drawings, Figure 1 is a top plan view of a potato-digger which embodies our invention. Fig. 2 is a vertical longitudinal section of the same. Fig. 3 is a rear elevation of the reel detached. Fig. 4 is a detail view.

A represents a machine-frame composed of the beams B, which form its sides, and the connecting-beams C and F. The beams B are farther apart at their rear ends than at their front ends, and are connected at their front ends by the beam C, and at their rear ends by the beam F. Journaled in blocks located on the under side of the beam B, and slightly in advance of the center, is a driving-shaft, G, to which the driving-wheels H are attached in the usual manner.

I and K represent beveled gear-wheels, keyed to the shaft G, near its center, and which face each other, as shown in Fig. 1.

A shaft, L, is journaled in blocks M and N, which blocks are pivoted to the under sides of the beams F and D at their centers, as shown.

To the front end of the shaft L is secured a beveled pinion, O, and to its rear end is secured a hub, P, which is provided with radial spokes Q.

A beam, D, passes through openings formed in the side beams, and is capable of being moved transversely in said openings, so as to cause the pinion O to mesh either with the wheel I or the wheel K. In order to cause this beam to move so as to bring the pinion in gear with either of the wheels, we provide a rock-shaft, R, which is journaled on the upper side of one of the beams B. This rock-shaft is provided with an arm, S, near the inner end of which arm is connected a rod, T, the outer end of which rod T is connected to the beam D. The arm S serves as a handle to turn the shaft R. By pulling the upper end of this handle in toward the center of the frame the pinion O is caused to mesh with the wheel I, and by reversing this movement the pinion is caused to mesh with the wheel K. By this construction the reel may be caused to rotate in either direction, and we are thereby enabled to cause the machine to throw the potatoes between any two rows desired after they have been dug. When it is not desired that the reel should rotate, the pinion can be caused to remain stationary between the gear-wheels and out of contact with either of them.

To the front end of the frame A are pivoted the shafts V by means of the bolts W.

A lever, X, is pivoted to one side of the shafts, near their rear ends, and extends rearwardly from the frame A, and is connected thereto, near the front end of the frame, by means of a link, Y.

An arm, Z, extends upwardly from the frame A, near its rear end, and is provided with openings or serrations A', by which means the rear end of the lever X can be secured either in a raised or lowered position.

To the front end of the frame A is attached a rearwardly and downwardly extending rod, B', which has its rear end connected to a shovel-plow, C', of the ordinary construction. This plow can be secured either in a raised or lowered position with respect to the frame A, and thus regulate the depth that it shall run in the ground by means of the bars D', which depend from the rear end of the frame. The bars D' are each provided with a series of openings, E', to which the plow may be attached at any desired point by means of the pins F', as will be readily understood. When the rear end of the lever X is lowered, the front end of the frame is depressed, which raises the rear end of the frame, and thereby lifts the plow out of the ground.

To each of the spokes of the reel, near their outer ends, we attach fingers G', which are provided at their lower ends with the sleeves H', through which the spokes pass. These sleeves are provided with segmental slots I', and through these slots and through the opening that is formed in the spoke is passed the pin K', which secures the sleeve to the spoke, while allowing it to partially rotate thereon. As the reel revolves, the fingers G' separate the potatoes from the dirt and sweep them between the rows. By securing the fingers on the ends of the spokes, so as to permit them to partially rotate thereon, as hereinbefore described, the draft on the animals is very materially lessened, and the machine is enabled to be drawn with much less labor than if the fingers were rigidly secured to the spokes.

By giving these fingers a partially-rotating motion, whenever an obstruction is struck they turn and give, and hence are not so liable to be broken as they would be if they were rigidly connected.

Having thus described our invention, we claim—

The combination, with the reel having the radial spokes, of the fingers G', attached to said spokes, and means for permitting the fingers to partially rotate thereon, substantially as described.

In testimony whereof we affix our signatures in presence of two witnesses.

FRANCIS O. WILLIAMS.
   AARON MATTICE.
   JOHN C. MATTICE.

Witnesses:
 J. L. WAUGH,
 O. S. SEARL.